United States Patent
Sawada

(10) Patent No.: US 9,557,950 B2
(45) Date of Patent: Jan. 31, 2017

(54) IMAGE PROCESSING APPARATUS FOR PRINTING OBJECT OF ORIGINAL IMAGE WITHIN PRINTABLE AREA ON PRINT MEDIUM, AND NON-TRANSITORY COMPUTER READABLE MEDIUM

(71) Applicant: BROTHER KOGYO KABUSHIKI KAISHA, Nagoya-shi, Aichi-ken (JP)

(72) Inventor: Kazuhide Sawada, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 2 days.

(21) Appl. No.: 14/661,073

(22) Filed: Mar. 18, 2015

(65) Prior Publication Data
US 2015/0277822 A1 Oct. 1, 2015

(30) Foreign Application Priority Data
Mar. 31, 2014 (JP) .................................. 2014-074697

(51) Int. Cl.
*G06K 15/00* (2006.01)
*G06F 3/12* (2006.01)

(52) U.S. Cl.
CPC ............. *G06F 3/1292* (2013.01); *G06F 3/125* (2013.01); *G06F 3/1208* (2013.01); *G06F 3/1237* (2013.01)

(58) Field of Classification Search
None
See application file for complete search history.

(56) References Cited

U.S. PATENT DOCUMENTS

| 7,626,743 | B2* | 12/2009 | Ozawa | H04N 1/3871 345/592 |
| 2003/0123732 | A1* | 7/2003 | Miyazaki | G06K 9/00449 382/186 |
| 2007/0013950 | A1* | 1/2007 | Kajihara | G06K 1/121 358/1.18 |
| 2010/0271646 | A1* | 10/2010 | Morimoto | G03G 15/5025 358/1.9 |
| 2012/0081718 | A1* | 4/2012 | Soriano | G06F 3/1208 358/1.9 |

FOREIGN PATENT DOCUMENTS

| JP | H03-254971 A | 11/1991 |
| JP | 2004-188712 A | 7/2004 |
| JP | 2008-262439 A | 10/2008 |
| JP | 2010-284818 A | 12/2010 |

* cited by examiner

*Primary Examiner* — Miya J Cato
(74) *Attorney, Agent, or Firm* — Scully, Scott, Murphy & Presser, P.C.

(57) ABSTRACT

An image processing apparatus includes a processor; memory storing instructions causing the apparatus to perform: acquiring original image data including an object; specifying margin area, which is located at a periphery of the original image and in which the object is not located; specifying a non-printable area, which is located at a periphery of a print medium and to which the printing apparatus is not capable of printing; determining, on the basis of information representing the non-printable area and information representing the margin area, whether the printing apparatus is capable of printing the whole of the object of the original image within a printable area on the print medium, to which the printing apparatus is capable of printing, without performing a reducing process on the object; and generating print data, from the original image data, according to a result of the determining.

12 Claims, 7 Drawing Sheets

IMAGE PROCESSING APPARATUS FOR PRINTING OBJECT OF ORIGINAL IMAGE WITHIN PRINTABLE AREA ON PRINT MEDIUM, AND NON-TRANSITORY COMPUTER READABLE MEDIUM

CROSS-REFERENCE TO RELATED APPLICATION

This application claims priority from Japanese Patent Application No. 2014-074697 filed on Mar. 31, 2014, the entire subject matter of which is incorporated herein by reference.

TECHNICAL FIELD

This disclosure relates to image processing for printing images.

BACKGROUND

There are various types of image processing for printing images. For example, there is a technology for setting the maximum paper size available in a printer as a document forming size and reducing document data which is a print target such that a document fits into a printable area. According to this technology, even if document data which is a print target does not have the concept of a page size like HTML data, it is possible to prevent a document from spreading out from the printable area, resulting in a data loss.

However, in a case of performing a reducing process on document data, there is often the case where the load of data processing is large. For example, there is a case where a data processing time increases. Also, in a case of omitting such data processing, a part of the document may not be printed. These problems are not limited to a case of printing a document and are common to a case of printing an arbitrary image.

SUMMARY

This disclosure is to suppress an image from spreading out outward from a printable area and suppress the load of data processing from becoming large.

This disclosure is to solve at least a part of the above described problem and can be implemented as the following application examples.

First Application Example

An image processing apparatus of a first application example includes: a processor; memory storing instructions that, when executed by the processor, causing the apparatus to perform: acquiring original image data representing an original image including an object; specifying margin area, which is located at a periphery of the original image and in which the object is not located, by analyzing the original image; specifying a non-printable area, which is located at a periphery of a print medium to be used by a printing apparatus and to which the printing apparatus is not capable of printing; determining, on the basis of information representing the non-printable area and information representing the margin area, whether the printing apparatus is capable of printing the whole of the object of the original image within a printable area on the print medium, to which the printing apparatus is capable of printing, without performing a reducing process, which reduces the size of the object, on the object; and generating print data to be supplied to the printing apparatus, from the original image data, according to a result of the determining, wherein in a case where it is determined, on the basis of the information representing the non-printable area and the information representing the margin area, that the printing apparatus is capable of printing the whole of the object of the original image within the printable area without performing the reducing process on the object, the print data is generated without performing the reducing process on the object, and wherein, in a case where it is not determined, on the basis of the information representing the non-printable area and the information representing the margin area, that the printing apparatus is capable of printing the whole of the object of the original image within the printable area without performing the reducing process on the object, the reducing process is performed on the object such that the whole of the object of the original image is capable of printing within the printable area, and the print data is generated.

According to this configuration, it is possible to suppress an object from spreading out from the printable area and suppress the load of data processing from becoming large.

Second Application Example

An image processing apparatus of a second application example includes: a processor; memory storing instructions that, when executed by the processor, causing the apparatus to perform: acquiring original image data representing an original image including an object; specifying margin area, which is located at a periphery of the original image and in which the object is not located, by analyzing the original image; specifying a non-printable area, which is located at a periphery of a print medium to be used by a printing apparatus and to which the printing apparatus is not capable of printing; determining, on the basis of information representing the non-printable area and information representing the margin area, whether the printing apparatus is capable of printing the whole of the object of the original image within a printable area on the print medium, to which the printing apparatus is capable of printing, by performing a moving process on the object without performing a reducing process, which reduces the size of the object, on the object; and generating print data to be supplied to the printing apparatus, from the original image data, according to a result of the determining, wherein in a case where it is determined on the basis of the information representing the non-printable area and the information representing the margin area that it is capable of printing the whole of the object of the original image within the printable area by performing the moving process on the object without performing the reducing process on the object, the moving process is performed on the object without performing the reducing process on the object, and the print data is generated.

According to this configuration, it is possible to suppress an object from spreading out from the printable area and suppress the load of data processing from becoming large.

Also, this disclosure can be implemented in various forms such as image processing methods and image processing apparatuses, computer programs for implementing the functions of the apparatuses or the methods, and recording media (for example, a recording medium which is not temporary) containing the computer programs.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

A. First Embodiment

Figure 1:
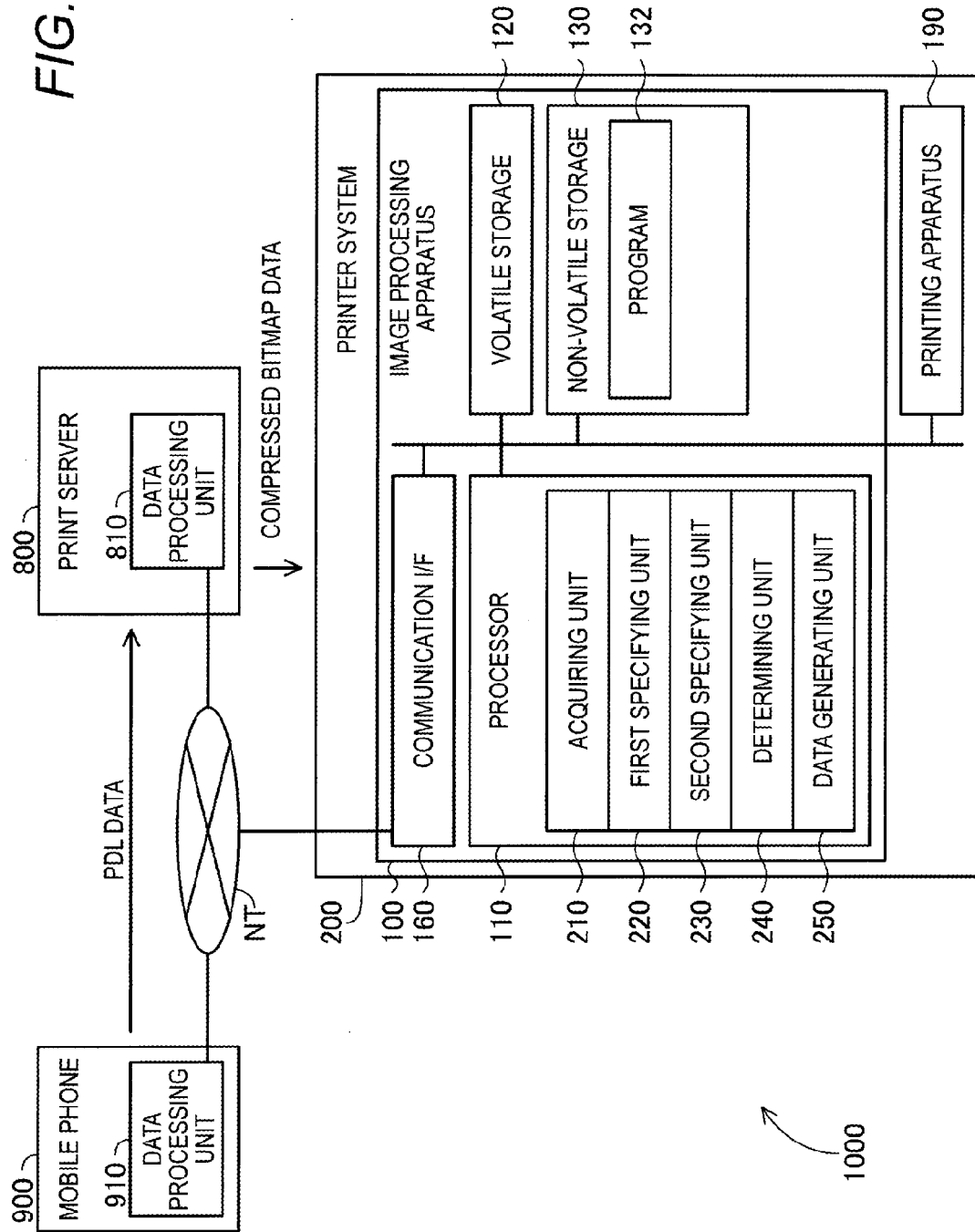
FIG. 1 is an explanatory view illustrating a network system 1000 according to an embodiment of this disclosure.

FIG. 1 is an explanatory view illustrating a network system 1000 according to an embodiment of this disclosure. The network system 1000 includes a network NT, and a mobile phone 900, a print server 800, and a printer system 200, which are connected to the network NT.

The mobile phone 900 includes a data processing unit 910 which processes data. The data processing unit 910 is a computer including a processor (for example, a so-called CPU) and a storage (for example, a DRAM and a flash memory). In order to use the printer system 200 to print an image, according to an instruction of a user, the data processing unit 910 transmits image data (for example, data described in a page description language (PDL) such as PDF data) to the print server 800. The data processing unit 910 may further transmit print setting information designating a print medium size (for example, A4) and the like, to the print server 800.

The print server 800 includes a data processing unit 810 which processes data. The data processing unit 810 is a computer including a processor (for example, a so-called CPU) and a storage (for example, a DRAM and a flash memory). If the image data is received from the mobile phone 900, the data processing unit 810 rasterizes the received data in accordance with the printer system 200, thereby generating bitmap data. The pixel density of the bitmap data is the same as the pixel density of a printing process of the printer system 200 (particularly, a printing apparatus 190) to be described below. For example, the data processing unit 810 performs rasterizing in a pixel density appropriate for the print medium size designated by the print setting information received from the mobile phone 900.

The bitmap data represents the color values (for example, the tone values (for example, 256 tone values from 0 to 255) of red (R), green (G), and blue (B)) of a plurality of pixels representing the image. The data processing unit 810 compresses the generated bitmap data, thereby generating compressed bitmap data. Thereafter, the data processing unit 810 transmits the compressed bitmap data to the printer system 200. The data processing unit 810 may further transmit the print setting information to the printer system 200.

The compression scheme of the compressed bitmap data is, for example, a lossless compression scheme (for example, so-called Packbits compression). The format of the compressed bitmap data is, for example, a so-called PWG raster format. The PWG raster format is a format proposed by the printer working group (PWG) of the IEEE-ISTO (The Institute of Electrical and Electronics Engineers-Industry Standards and Technology Organization).

The printer system 200 prints the image using the compressed bitmap data received from the print server 800. The printer system 200 includes an image processing apparatus 100, and the printing apparatus 190 connected to the image processing apparatus 100. The image processing apparatus 100 includes a processor 110, a volatile storage 120, a non-volatile storage 130, and a communication interface 160.

The processor 110 is a unit for performing data processing, for example, a so-called CPU. The volatile storage 120 is, for example, a so-called DRAM, and the non-volatile storage 130 is, for example, a so-called a flash memory. The non-volatile storage 130 stores a program 132.

The processor 110 executes the program 132, thereby implementing a variety of functions. In the present embodiment, the processor 110 implements the functions of an acquiring unit 210, a first specifying unit 220, a second specifying unit 230, a determining unit 240, and a data generating unit 250. The individual processing units will be described in detail. Also, the processor 110 temporarily stores various intermediate data to be used to execute a program (for example, the program 132), in a storage (for example, the volatile storage 120 or the non-volatile storage 130).

The communication interface 160 is an interface (for example, a wireless interface of IEEE 802.11) for communication with other apparatuses. The image processing apparatus 100 is connected to the network NT through the communication interface 160. Also, the printing apparatus 190 may be connected to the image processing apparatus 100 through the communication interface 160.

The printing apparatus 190 is an apparatus for printing images on print media (for example, paper). In the present embodiment, the printing apparatus 190 is an inkjet type printing apparatus using cyan (C), yellow (Y), and black (K) ink. However, as the printing apparatus 190, any other type printing apparatus (for example, a laser type printing apparatus) can be used.

Figure 2:
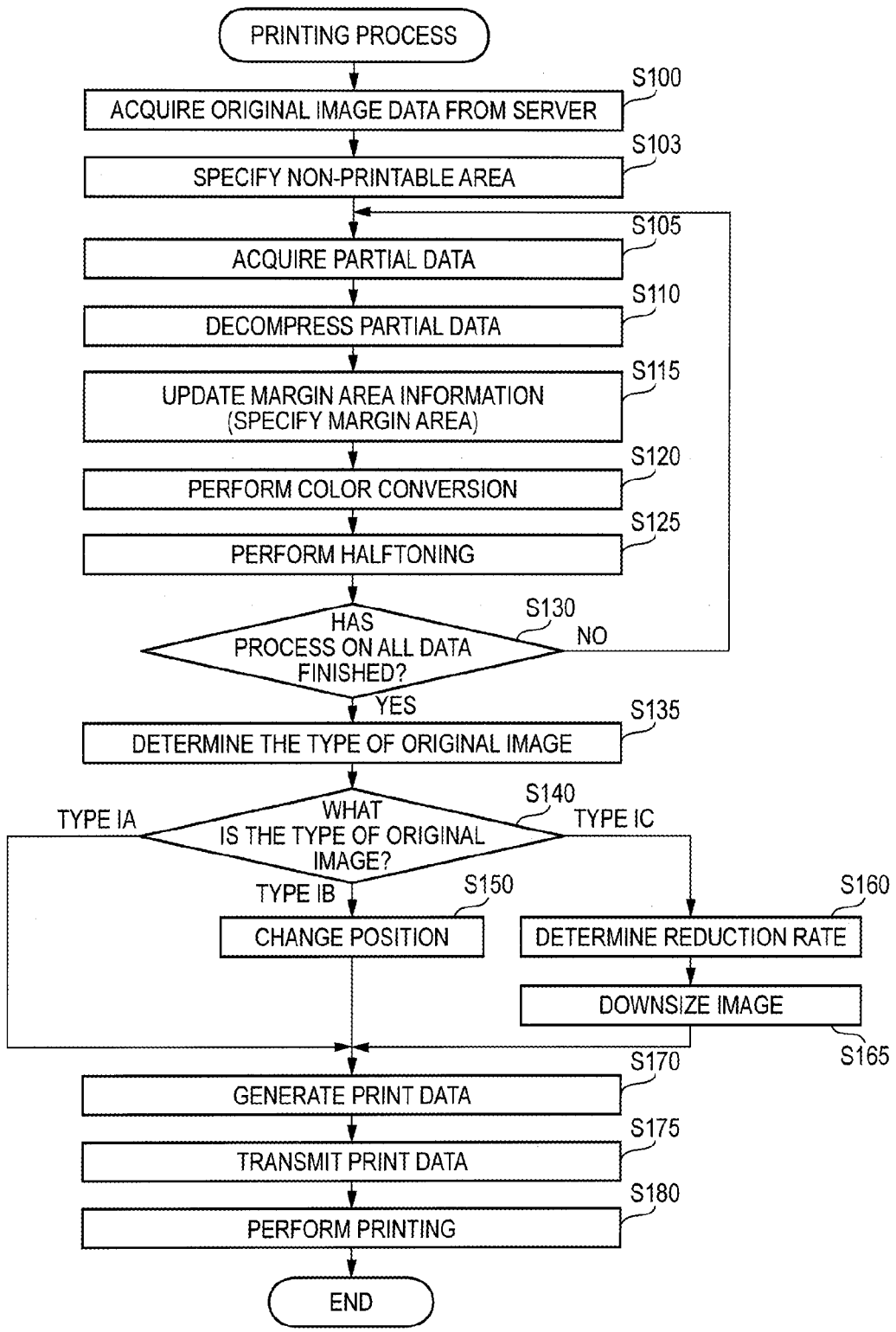
FIG. 2 is a flow chart illustrating a printing process which is performed by a printer system 200.
Figure 3:
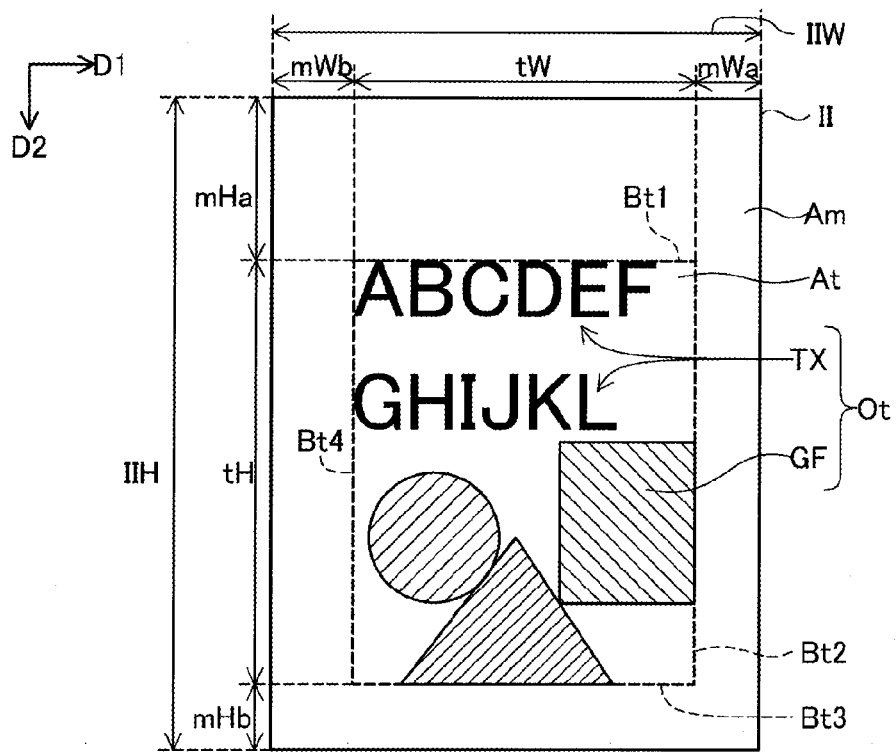
FIG. 3 is a schematic diagram illustrating an example of an original image II which is represented by original image data.

FIG. 2 is a flow chart illustrating the printing process which is performed by the printer system 200. In Step S100, the acquiring unit 210 (FIG. 1) acquires the compressed bitmap data, as original image data being a process target, from the print server 800. FIG. 3 is a schematic diagram illustrating an example of an original image II which is represented by the original image data. The original image II is a rectangular image surrounded by two sides parallel to a first direction D1 and two sides parallel to a second direction D2 perpendicular to the first direction D1. The original image II is represented by a plurality of pixels (not shown) arranged in a lattice pattern along the first direction D1 and the second direction D2.

Incidentally, the first direction D1 extends from left to right in top view and the second direction D2 extends from up to down in top view. Hereinafter, a forward direction of the first direction D1 (a right side in top view) is referred as a first direction side, and a forward direction of the second direction D2 (a bottom side in top view) is referred as a second direction side, In FIG. 3, as examples of objects which are represented by the original image II, a letter string TX and graphic forms GF are shown. A rectangular area At of FIG. 3 is an area surrounded by two sides Bt1 and Bt3 parallel to a first direction D1 and two sides Bt2 and Bt4 parallel to a second direction D2, and is the smallest rectangular area including all objects TX and GF. Hereinafter, the smallest rectangular area including all objects will be referred to as the object area At. In the original image II, an area outside of the object area At is an area (hereinafter, referred to as a margin area Am) which is arranged at the periphery of the original image II and does not include the objects TX and GF. The margin area Am is an area representing a background and including the edge of the original image II. The sides Bt1 to Bt4 represent the boundary of the object area At and the margin area Am (hereinafter, the sides Bt1 to Bt4 are also referred to as boundary lines Bt1 to Bt4). The second boundary line Bt2 is a boundary line on the first direction (D1) side as compared to the fourth boundary line Bt4, and the third boundary line Bt3 is a boundary line on the second direction (D2) side as compared to the first boundary line Bt1.

FIG. 3 shows a variety of parameters representing the sizes of the original image II, the object area At, and the margin area Am. A overall width IIW represents the length of the original image II in the first direction D1, and an overall height IIH represents the length of the original image II in the second direction D2. An object width tW represents the length of the object area At in the first direction D1, and an object height tH represents the length of the object area At in the second direction D2. The whole of the objects TX and GF which are represented by the original image II can be considered as one object Ot which is represented by the original image II. In this case, the object width tW of the object area At corresponds to the length of the object Ot in the first direction D1, and the object height tH of the object area At corresponds to the length of the object Ot in the second direction D2. Also, as the unit of length for heights, widths, and the like, the number of pixels can be used.

A right margin width mWa represents the length of a portion of the margin area Am, which is, which is located at an edge of the original image II on the first direction (D1) side (that is, a portion arranged along the edge of the original image II on the first direction (D1) side), in the first direction D1. The left margin width mWb represents the length of a portion of the margin area Am, which is located at an edge on the opposite direction side to the first direction D1, in the first direction D1. The sum of the right margin width mWa, the object width tW, and the left margin width mWb is equal to the overall width IIW of the original image II. Therefore, the processor 110 (for example, the determining unit 240) can specify the object width tW by subtracting the right margin width mWa and the left margin width mWb from the overall width IIW.

A lower margin height mHb represents the length of a portion of the margin area Am, which is located at an edge on the second direction (D2) side, in the second direction D2. An upper margin height mHa represents the length of a portion of the margin area Am, which is located at an edge on the opposite direction side to the second direction D2, in the second direction D2. The sum of the upper margin height mHa, the object height tH, and the lower margin height mHb is equal to the overall height IIH of the original image II. Therefore, the processor 110 (for example, the determining unit 240) can specify the object height tH by subtracting the upper margin height mHa and the lower margin height mHb from the overall height IIH.

In Step S103 of FIG. 2, the second specifying unit 230 specifies a non-printable area which will be arranged at the periphery of a print medium to be used by the printing apparatus 190 and cannot be printed by the printing apparatus 190. The second specifying unit 230 acquires the print setting information from the print server 800, and the printing apparatus 190 uses a print medium having the size designated by the acquired print setting information.

Figure 4A:
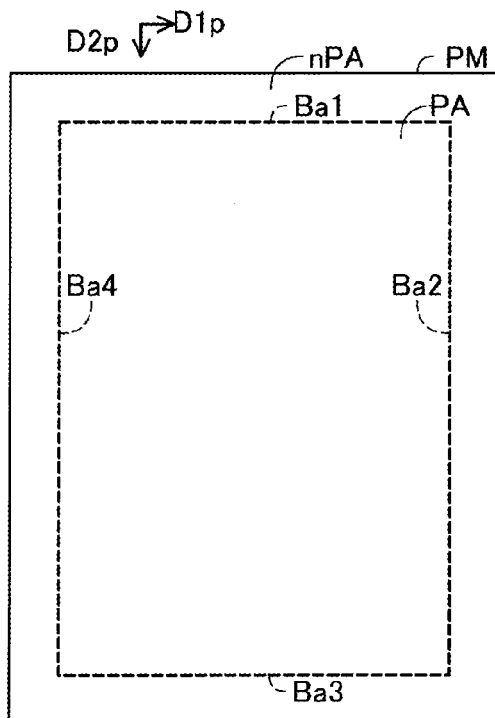
FIG. 4A is a schematic diagram illustrating a print medium PM.

FIG. 4A is a schematic diagram illustrating a print medium PM. The print medium PM is a rectangular sheet surrounded by two sides parallel to a first direction D1p, and two sides parallel to a second direction D2p perpendicular to the first direction D1p. The first direction D1p corresponds to the first direction D1 of the original image (FIG. 3), and the second direction D2p corresponds to the second direction D2 of the original image II.

FIG. 4A shows a printable area PA and a non-printable area nPA on the print medium PM. The printable area PA is an area on the print medium PM which can be printed by the printing apparatus 190. The area on the print medium PM which can be printed by the printing apparatus 190 means an area on the print medium PM where the printing apparatus 190 can form an image with color materials. In the example of FIG. 4A, the printable area PA is a rectangular area surrounded by two sides Ba1 and Ba3 parallel to the first direction D1p and two sides Ba2 and Ba4 parallel to the second direction D2p. The non-printable area nPA is an area which is arranged at the periphery of the print medium PM and cannot be printed by the printing apparatus 190. The sides Ba1 to Ba4 represent the boundary of the printable area PA and the non-printable area nPA (hereinafter, the sides Ba1 to Ba4 are also referred to as boundary lines Ba1 to Ba4). The second boundary line Ba2 is a boundary line on the first direction (Dip) side as compared to the fourth boundary line Ba4, and the third boundary line Ba3 is a boundary line on the second direction (D2p) side as compared to the first boundary line Ba1.

Figure 4B:
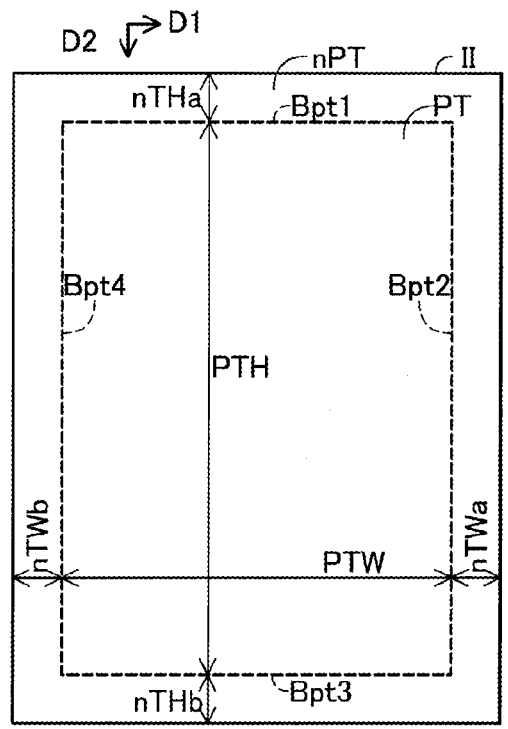
FIG. 4B is a schematic diagram illustrating a print target area PT and a non-print target area nPT on the original image.

FIG. 4B is a schematic diagram illustrating a print target area PA and a non-print target area nPT on the original image II. In a case of printing the original image II on the print medium PM (FIG. 4A), the print target area PT is arranged on the printable area PA, and the non-print target area nPT is arranged on the non-printable area nPA. That is, the print target area PT is associated with the printable area PA, and the non-print target area nPT is associated with the non-printable area nPA. Also, with respect to each area, the correspondence relation between the position on the original image II and the position on the print medium PM is determined in advance.

Boundary lines Bpt1 to Bpt4 of FIG. 4B are boundary lines of the print target area PT and the non-print target area nPT. The four boundary lines Bpt1 to Bpt4 correspond to the four boundary lines Ba1 to Ba4 on the print medium PM (FIG. 4A), respectively. The two boundary lines Bpt1 and Bpt3 are parallel to the first direction D1, and the other two boundary lines Bpt2 and Bpt4 are parallel to the second direction D2. The second boundary line Bpt2 is a boundary line on the first direction (D1) side as compared to the fourth boundary line Bpt4, and the third boundary line Bpt3 is a boundary line on the second direction (D2) side as compared to the first boundary line Bpt1.

FIG. 4B shows a variety of parameters representing the sizes of the print target area PT and the non-print target area nPT. A print target width PTW represents the length of the print target area PT in the first direction D1, and a print target height PTH represents the length of the print target area PT in the second direction D2.

Also, a right non-target width nTWa represents a portion of the non-print target area nPT, which is located at an edge on the first direction (D1) side, in the first direction D1. A left non-target width nTWb is the length of a portion of the non-print target area nPT, which is arranged on the opposite direction side to the first direction D1, in the first direction D1. The sum of the right non-target width nTWa, the print target width PTW, and the left non-target width nTWb is equal to the overall width IIW of FIG. 3. Therefore, the processor 110 (for example, the determining unit 240) can specify the print target width PTW by subtracting the right non-target width nTWa and the left non-target width nTWb from the overall width IIW.

Also, a lower non-target height nTHb represents a portion of the non-print target area nPT, which is located at an edge on the second direction (D2) side, in the second direction D2. An upper non-target height nTHa represents the length of a portion of the non-print target area nPT, which is located at an edge on the opposite direction side to the second direction D2, in the second direction D2. The sum of the upper non-target height nTHa, the print target height PTH, and the lower non-target height nTHb is equal to the overall height IIH of FIG. 3. Therefore, the processor 110 (the determining unit 240) can specify the print target height PTH by subtracting the upper non-target height nTHa and the lower non-target height nTHb from the overall height IIH.

With respect to each area, the correspondence relation between the position on the print medium PM and the position on the original image II is determined in advance for each print medium (PM) size. Therefore, the positions of the boundary lines Ba1 to Ba4 on the print medium PM and the positions of the boundary lines Bpt1 to Bpt4 on the original image II are determined in advance for each print medium (PM) size. In Step S103 of FIG. 2, on the basis of the print medium (PM) size designated by the print setting information, the second specifying unit 230 specifies the non-printable area nPA on the print medium PM. Further, on the basis of the shape, size, and position of the specified non-printable area nPA, the second specifying unit 230 specifies the positions of the boundary lines Ba1 to Ba4 defining the non-printable area nPA. The positions of the boundary lines Bpt1 to Bpt4 on the original image II are determined according to the positions of the boundary lines Ba1 to Ba4 on the print medium PM. On the basis of the specified boundary lines Ba1 to Ba4, the second specifying unit 230 specifies the positions of the boundary lines Bpt1 to Bpt4 and the non-print target area nPT on the original image II.

Also, information (hereinafter, referred to as print medium information) representing the correspondence relation between the print medium (PM) size and the shape and size of the non-printable area nPA may be incorporated in the second specifying unit 230 in advance. Alternatively, the print medium information may be stored in a storage (for example, the non-volatile storage 130) in advance. Also, information representing the positions of the boundary lines Bpt1 to Bpt4 associated with the print medium size designated by the print setting information is referred to as non-print target area information. As the information representing the positions of the boundary lines Bpt1 to Bpt4, for example, information representing the parameters nTWa, nTWb, nTHa, and nTHb described in FIG. 4B can be used.

In Step S105 of FIG. 2, the data generating unit 250 (FIG. 1) acquires partial data which is a part of the original image data, from the original image data. The partial data corresponds to one block in a case where compression of the original image data (that is, compressed bitmap data) is performed in units of a block. As one block, for example, one pixel line extending in the first direction D1 (FIG. 3) can be used. Decompression of the compressed data can be performed in units of a block. In Step S110, the data generating unit 250 decompresses the acquired partial data.

In Step S115, the first specifying unit 220 analyzes the decompressed partial data, thereby specifying the margin area Am included in the original image II (FIG. 3). For example, the first specifying unit 220 classifies pixels of a predetermined color (for example, white) into background pixels, and classifies pixels of the other colors into object pixels representing the objects. Then, the first specifying unit 220 specifies the smallest rectangular area including the whole of a range in which the object pixels are distributed, as the object area At, and specifies the other area of the original image II except for the object area At, as the margin area Am.

Also, in Step S115 of FIG. 2, analyzable image data (that is, decompressed image data) can be only a part of the original image data. The first specifying unit 220 stores information (referred to as margin area information) representing a provisional margin area Am specified from the decompressed image data, in a storage (for example, the volatile storage 120). Thereafter, the first specifying unit 220 updates the margin area information whenever a new part of the original image II is analyzed in Step S115. Also, as the margin area information, for example, information representing the parameters mWa, mWb, mHa, and mHb described with reference to FIG. 3 can be used.

In Step S120, the data generating unit 250 performs color conversion on the decompressed partial data. Specifically, according to a predetermined look-up table, the data generating unit 250 converts the R, G, and B tone values of each pixel into the tone values of a plurality of color materials (here, the tone values of cyan C, magenta M, yellow Y, and black K) which is used in the printing apparatus 190. The tone value of each color material is a tone value corresponding to the quantity of the corresponding color material at each pixel position, (hereinafter, referred to as color-material tone value). In the first embodiment, color-material tone values are represented by 256 tone values from 0 to 255.

In Step S125, the data generating unit 250 performs halftoning using the color-material tone values of the individual color materials. As halftoning, a process according to a so-called error diffusion method is performed. Alternatively, a method using a dither matrix can be used.

In Step S130, the data generating unit 250 determines whether the process on the whole of the original image data has finished. In a case where there is any unprocessed partial data ("No" in Step S130), the data generating unit 250 returns to Step S105 and performs the processes of Steps S105 to S125 on the unprocessed partial data. The data generating unit 250 repeats the processes of Steps S105 to S125 until the processes on all partial data finishes. As described above, the final margin area information can represent an appropriate margin area Am of the original image II.

In a case where the process on all partial data has finished ("Yes" in Step S130), in Step S135, on the basis of the margin area information representing the margin area Am (FIG. 3) and the above described non-print target area information representing the non-print target area nPT (FIG. 4B), the determining unit 240 determines which of three types IA, IB, and IC the type of the original image II is. Next, in Step S140, the determining unit 240 branches the process according to the type of the original image II determined. Also, the non-print target area nPT (FIG. 4B) is associated with the non-printable area nPA (FIG. 4A). Therefore, it can be said that the non-print target area information represents the non-printable area nPA.

The outline of each of the three types IA, IB, and IC is as follows.

The first type IA is a case where the printing apparatus 190 is capable of printing the whole of the object Ot within the printable area PA on the print medium PM, without performing both of the reducing process and the moving process on the object Ot.

The second type IB is a case where the type of the original image II is not the first type IA and the printing apparatus 190 is capable of printing the whole of the object Ot within the printable area PA on the print medium PM by performing the moving process on the object Ot without performing the reducing process on the object Ot.

The third type IC is a case where it is determined that the type of the original image II is not any one of the first type IA and the second type IB. That is, a case where in order for the printing apparatus 190 to print the whole of the object Ot within the printable area PA on the print medium PM, the reducing process on the object Ot is necessary.

Figure 5A:
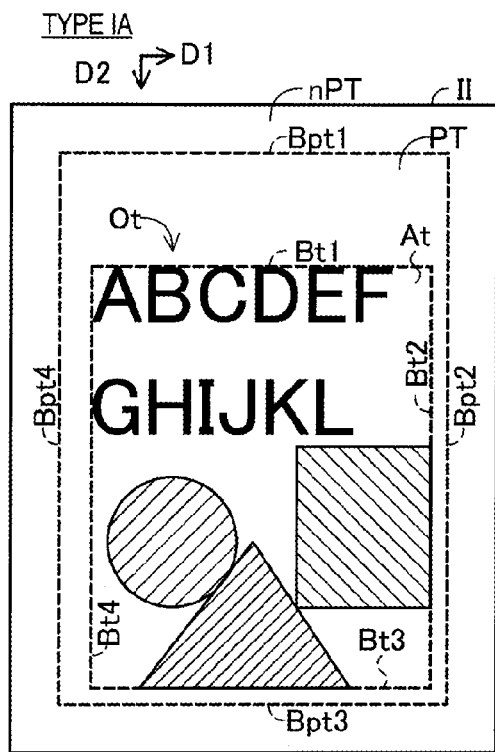
FIG. 5A is a view illustrating an original image of a first type IA.
Figure 5B:
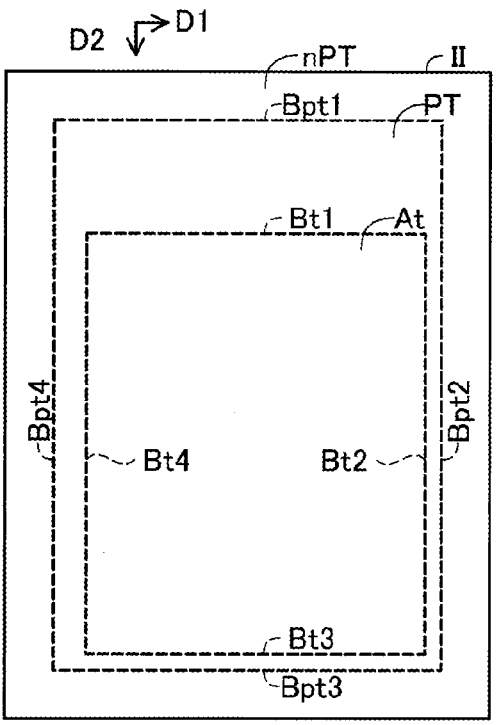
FIG. 5B is a schematic diagram illustrating an original image II in a case where the type of the original image is the first type.
Figure 5C:
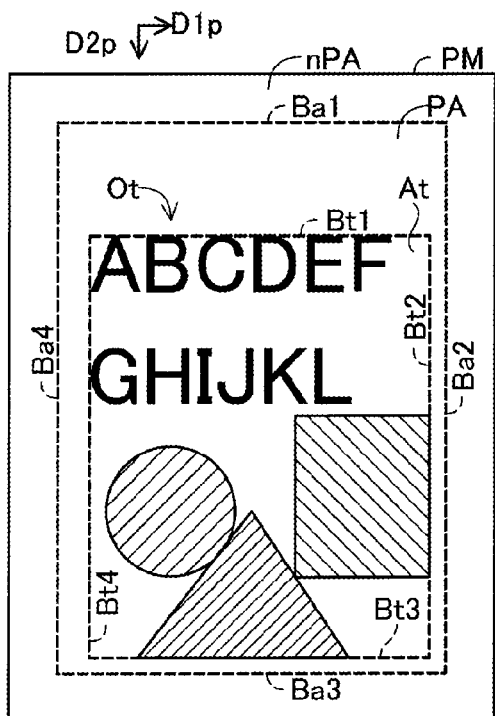
FIG. 5C is a schematic diagram illustrating an image which is printed on a print medium in a case where the type of an original image is the first type.

First, a case where the type of the original image II is the first type IA will be described. FIGS. 5A to 5C are schematic diagrams illustrating the original image II and an image which is printed on the print medium PM, in a case where the type of the original image II is the first type IA. FIG. 5A shows the original image II, and FIG. 5B shows the arrangement of the boundary lines Bt1 to Bt4 and the boundary lines Bpt1 to Bpt4 on the original image II. As shown in FIGS. 5A to 5C, the whole of the object area At is arranged within the print target area PT. That is, the parameters mWa, mWb, mHa, and mHb representing the margin area Am (FIG. 3) and the parameters nTWa, nTWb, nTHa, and nTHb representing the non-print target area nPT (FIG. 4B) satisfy the following four relational expressions A1 to A4.

(RIGHT MARGIN WIDTH $mWa$)≥(RIGHT NON-TARGET WIDTH $nTWa$)      A1)

(LEFT MARGIN WIDTH $mWb$)≥(LEFT NON-TARGET WIDTH $nTWb$)      A2)

(UPPER MARGIN HEIGHT $mHa$)≥(UPPER NON-TARGET HEIGHT $nTHa$)      A3)

(LOWER MARGIN HEIGHT $mHb$)≥(LOWER NON-TARGET HEIGHT $nTHb$)      A4)

In a case where the above four relational expressions A1 to A4 are satisfied, the determining unit 240 determines that the type of the original image II is the first type IA.

As shown in FIG. 2, in the case where the type of the original image II is the first type IA, the process proceeds from Step S140 to Step S170. In Step S170, the data generating unit 250 generates print data to be supplied to the printing apparatus 190, using the halftone data generated in Step S125. The print data represents the result of the halftoning in a format analyzable by the printing apparatus 190. Also, the print data is configured so as to be printed on a print medium having the size designated by the print setting information. In Step S175, the data generating unit 250 transmits the generated print data to the printing apparatus 190. Also, the data generating unit 250 transmits the print setting information to the printing apparatus 190. In Step S180, the printing apparatus 190 prints an image according to the received print data, on a print medium having the size designated by the print setting information. Then, the process of FIG. 2 finishes.

FIG. 5C shows the image to be printed. As shown in FIG. 5C, the whole of the object Ot is printed within the printable area PA on the print medium PM. Also, in the present embodiment, the case where it is determined that the type of the original image II is the first type IA is included in a case where it is determined that it is capable of printing the whole of the object Ot within the printable area PA without performing the reducing process on the object Ot.

Figure 6A:
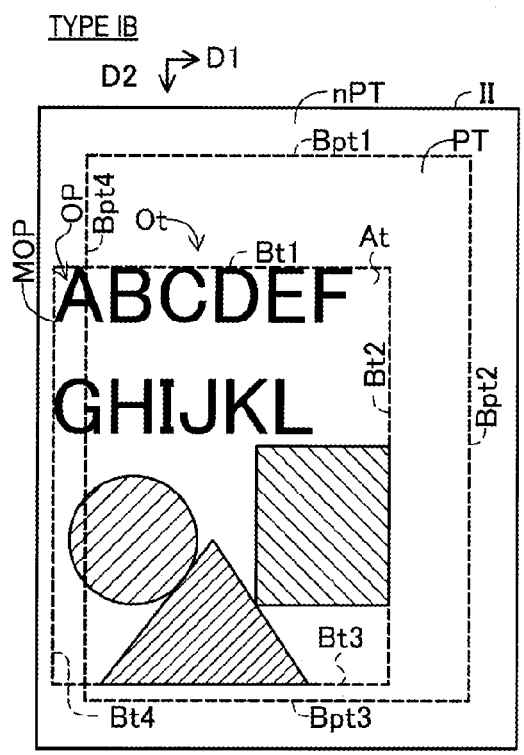
FIG. 6A is a view illustrating an original image of a second type.
Figure 6B:
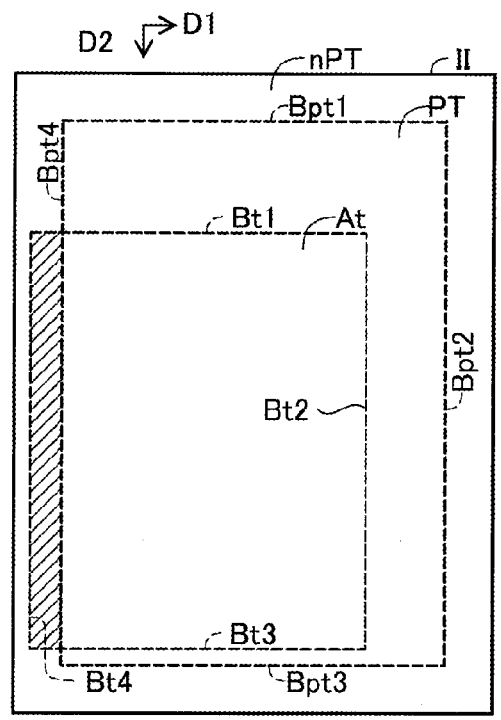
FIG. 6B is a schematic diagram illustrating an original image in a case where the type of the original image is the second type.

Subsequently, a case where the type of the original image II is the second type IB will be described. FIGS. 6A to 6D are schematic diagrams illustrating the original image II and an image which is printed on a print medium PM, in the case where the type of the original image II is the second type IB. FIG. 6A shows the original image II, and FIG. 6B shows the arrangement of the boundary lines Bt1 to Bt4 and the boundary lines Bpt1 to Bpt4 on the original image II. In the example of FIGS. 6A and 6B, the fourth boundary line Bt4 is arranged outside the print target area PT. In FIG. 6A, an outer portion OP represents a portion of the object Ot arranged outside the print target area PT. Also, the most outer portion MOP represents a portion of the outer portion OP farthest from the print target area PT. Also, the size of the object area At is a size allowing the whole of the object area At to be arranged within the print target area PT. In general, in a case where the size of the object area At is a size arrangeable within the print target area PT, and a part of the object area At is arranged outside the print target area PT, the determining unit 240 determines that the type of the original image II is the second type IB.

In this case, the parameters mWa, mWb, mHa, and mHb representing the margin area Am (FIG. 3) and the parameters nTWa, nTWb, nTHa, and nTHb representing the non-print target area nPT (FIG. 4B) satisfy the following three relational expressions B1 to B3.

(RIGHT MARGIN WIDTH $mWa$+LEFT MARGIN WIDTH $mWb$)≥(RIGHT NON-TARGET WIDTH $nTWa$+LEFT NON-TARGET WIDTH $nTWb$)   B1)

(UPPER MARGIN HEIGHT $mHa$+LOWER MARGIN HEIGHT $mHb$)≥(UPPER NON-TARGET HEIGHT $nTHa$+LOWER NON-TARGET HEIGHT $nTHb$)   B2)

(RIGHT MARGIN WIDTH $mWa$<RIGHT NON-TARGET WIDTH $nTWa$) or (LEFT MARGIN WIDTH $mWb$<LEFT NON-TARGET WIDTH $nTWb$) or (UPPER MARGIN HEIGHT $mHa$<UPPER NON-TARGET HEIGHT $nTHa$) or (LOWER MARGIN HEIGHT $mHb$<LOWER NON-TARGET HEIGHT $nTHb$)   B3)

Here, the sum of the right margin width mWa and the left margin width mWb is referred to as a first margin length, and the sum of the upper margin height mHa and the lower margin height mHb is referred to as a second margin length, and the sum of the right non-target width nTWa and the left non-target width nTWb is referred to as a first non-target area length, and the sum of the upper non-target height nTHa and the lower non-target height nTHb is referred to as a second non-target area length.

The first and second relational expressions B1 and B2 represent that the size of the object area At is a size allowing the whole of the object area At to be arranged within the print target area PT. The third relational expression B3 represents that a part of the object area At is arranged outside the print target area PT. In a case where the above three relational expressions B1 to B3 are satisfied, the determining unit 240 determines that the type of the original image II is the second type IB. Also, a case where the third relational expression B3 is satisfied is the same as a case where at least one of the above relational expressions A1 to A4 is not satisfied, that is, a case where the type of the original image II is not the first type IA.

As shown in FIG. 2, in the case where the type of the original image II is the second type IB, the process proceeds from Step S140 to Step S150. In Step S150, the data generating unit 250 performs the moving process on the halftone data generated in Step S125 such that the object Ot moves. The data generating unit 250 moves the object Ot such that the whole of the object Ot can be printed within the printable area PA. Also, in the present embodiment, the data generating unit 250 uses the opposite direction to a direction in which the object Ot spreads out from the print target area PT, as the movement direction of the object Ot. In the example of FIG. 6A, the movement direction is the first direction D1.

Figure 6C:
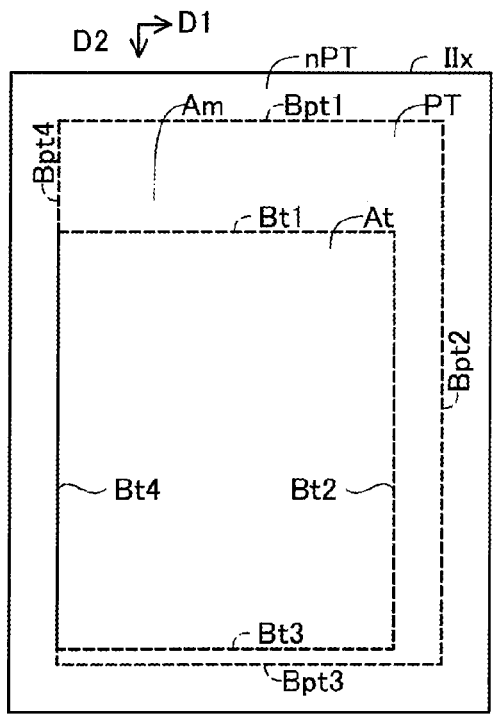
FIG. 6C is a schematic diagram illustrating an image which is represented by data having been subjected to a moving process.

FIG. 6C shows an image IIx which is represented by the data having been subjected to the moving process. FIG. 6C shows the boundary lines Bpt1 to Bpt4 of the print target area PT and the non-print target area nPT, and the boundary lines Bt1 to Bt4 of the object area At and the margin area Am. As shown in FIG. 6C, the object area At is moved such that the fourth boundary line Bt4 arranged outside the print target area PT overlaps the closest fourth boundary line Bpt4.

As shown in FIG. 2, if Step S150 finishes, the data generating unit 250 proceeds to Step S170. In Step S170, the data generating unit 250 generates print data by using the data having been subjected to the moving process (that is, the halftone data). Thereafter, according to Steps S170 and S180, an image is printed.

Figure 6D:
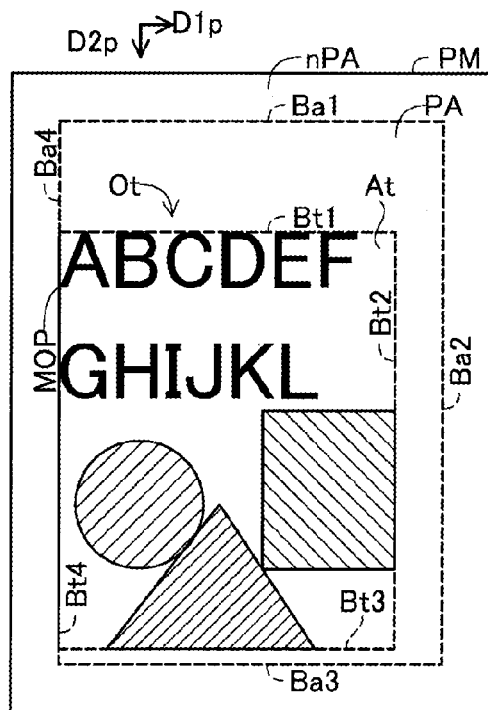
FIG. 6D is a schematic diagram illustrating an image which is printed on a print medium in a case where the type of an original image is the second type.

FIG. 6D shows the image to be printed. As shown in FIG. 6D, the whole of the object Ot is printed within the printable area PA on the print medium PM. As described above, in the case where the type of the original image II is the second type IB, since the moving process is performed on the object Ot, it is possible to suppress the object Ot from spreading out outward from the printable area PA. Also, the most outer portion MOP of the object Ot is arranged on the edge of the printable area PA (specifically, on the fourth boundary line Ba4). As described above, since the change of the position of the object Ot is minimized, it is possible to suppress a feeling of strangeness due to the movement of the object Ot. Also, in the present embodiment, the case where it is determined that the type of the original image II is the second type IB is included in a case where it is determined that it is capable of printing the whole of the object Ot within the printable area PA by performing the moving process on the object Ot without performing the reducing process on the object Ot. Also, in the present embodiment, it can be said that the case where it is determined that the type of the original image II is the second type IB is included in a case where it is determined that it is capable of printing the whole of the object Ot within the printable area PA without performing the reducing process on the object Ot.

Also, on the original image II (FIG. 6A), the object Ot can pass beyond an arbitrary boundary line of the boundary lines Bpt1 to Bpt4 of the print target area PT and spread out outward from the print target area PT. In a case where a part of the object Ot spreads out outward from the printable area PA if the object Ot is printed without being moved, the moving process is performed such that the spreading part comes into contact with a boundary line closest to the spreading part (a boundary line of the printable area PA). Therefore, the moved object Ot is not always needed to be in contact with only the fourth boundary line Bt4 of the boundary lines Bt1 to Bt4 of the printable area PA, and may be in contact with any other boundary line. Also, a part of the object Ot may spread out from two neighboring boundary lines (for example, Ba1 and Ba4, or Ba1 and Ba2) of the printable area PA. In this case, the moving process is performed such that the spreading part comes into contact with the two boundary lines. Therefore, the moved object Ot is not always needed to be in contact with only one fourth boundary line Bt4 of the boundary lines Bt1 to Bt4 of the printable area PA, and may be in contact with two adjacent boundary lines.

Figure 7A:
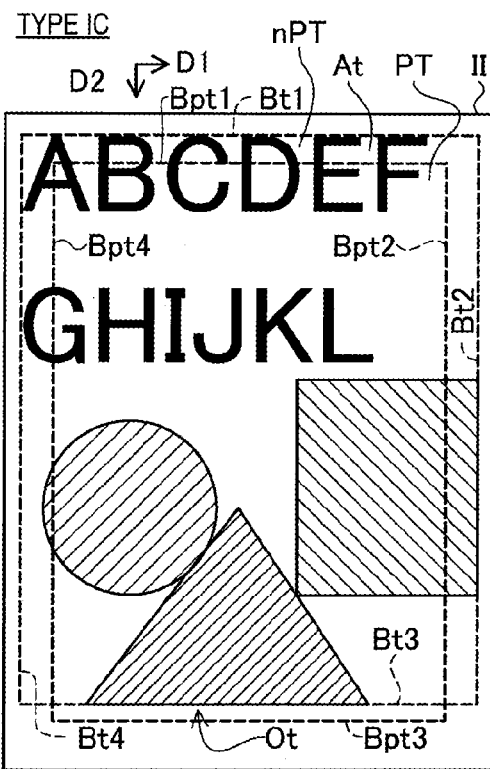
FIG. 7A is a view illustrating an original image of a third type.
Figure 7B:
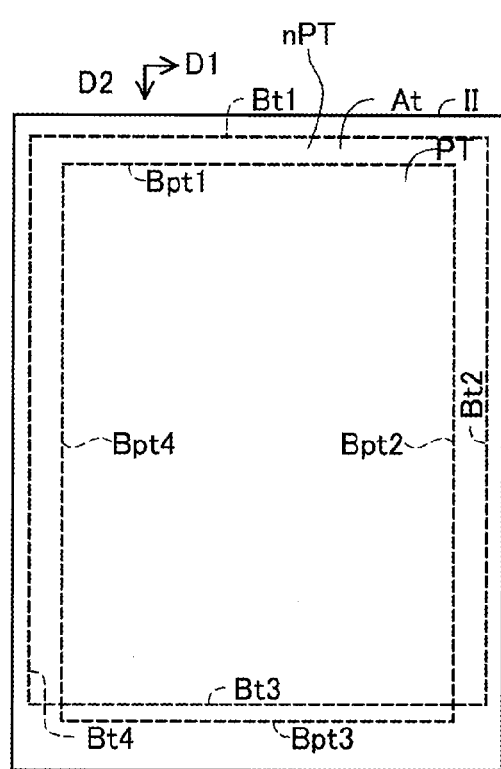
FIG. 7B is a schematic diagram illustrating an original image in a case where the type of the original image is the third type.

Subsequently, a case where the type of the original image II is the third type IC will be described. FIGS. 7A to 7D are schematic diagrams illustrating the original image II and an image which is printed on a print medium PM, in the case where the type of the original image II is the third type IC. FIG. 7A shows the original image II, and FIG. 7B shows the arrangement of the boundary lines Bt1 to Bt4 and the boundary lines Bpt1 to Bpt4 on the original image II. In the example of FIGS. 7A and 7B, the second boundary line Bt2, and the fourth boundary line Bt4 on the opposite side to the second boundary line Bt2 are arranged outside the print target area PT. That is, the object width tW which is the length of the object area At in the first direction D1 is larger than the print target width PTW which is the length of the print target area PT in the first direction D1. This means that it is not capable of printing the whole of the object Ot within the printable area PA unless the reducing process is performed on the object Ot. In general, in a case where at least one of the lengths of the object area At in the first direction D1 and the second direction D2 is larger than the corresponding length of the printable area PA, it is determined that the type of the original image II is the third type IC.

In this case, the parameters mWa, mWb, mHa, and mHb representing the margin area Am (FIG. 3) and the parameters nTWa, nTWb, nTHa, and nTHb representing the non-print target area nPT (FIG. 4B) satisfy the following relational expression C1.

[(RIGHT MARGIN WIDTH $mWa$+LEFT MARGIN WIDTH $mWb$)<(RIGHT NON-TARGET WIDTH $nTWa$+LEFT NON-TARGET WIDTH $nTWb$)] or [(UPPER MARGIN HEIGHT $mHa$+LOWER MARGIN HEIGHT $mHb$)<(UPPER NON-TARGET HEIGHT $nTHa$+LOWER NON-TARGET HEIGHT $nTHb$)]     (C1)

In a case where the above relational expression C1 is satisfied, the determining unit 240 determines that the type of the original image II is the third type IC.

As shown in FIG. 2, in the case where the type of the original image II is the third type IC, the process proceeds from Step S140 to Step S160. In Step S160, the data generating unit 250 determines a reduction rate for the object Ot. In the present embodiment, the data generating unit 250 determines the reduction rate such that the size of the reduced object Ot becomes the largest size allowing the whole of the object Ot to be arranged within the printable area PA. Next, in Step S165, the data generating unit 250 performs the reducing process of reducing the object Ot, on the halftone data generated in Step S125. As the reducing process on the image data, a known method can be used. For example, a process of thinning some pixels may be used. Alternatively, the color value (for example, halftone-processed tone value) of each pixel of an area to show the reduced object Ot may be computed by interpolation.

Figure 7C:
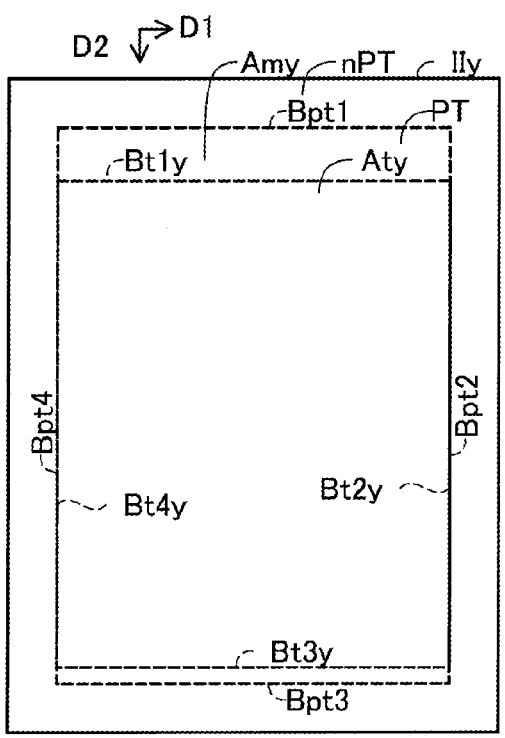
FIG. 7C is a schematic diagram illustrating an image which is represented by data having been subjected to a reducing process.
Figure 7D:
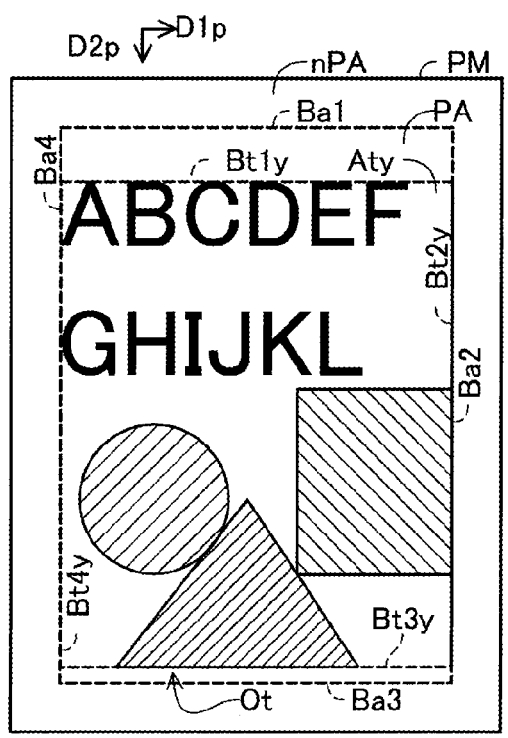
FIG. 7D is a schematic diagram illustrating an image which is printed on a print medium in a case where the type of an original image is the third type.

FIG. 7C shows an image Hy which is represented by the data having been subjected to the reducing process. FIG. 7C shows the boundary lines Bpt1 to Bpt4 of the print target area PT and the non-print target area nPT, and the boundary lines Bt1y to Bt4y of a margin area Amy and an object area Aty to show the reduced object Ot. In Step S165, the data generating unit 250 adjusts the position of the reduced object area Aty such that the whole of the object area Aty (that is, the whole of the object Ot) is arranged within the print target area PT as shown in FIG. 7D. Also, among the boundary lines Bt1y to Bt4y of the object area Aty, the second boundary line Bt2y is in contact with the second boundary line Bpt2 of the print target area PT, and the fourth boundary line Bt4y is in contact with the fourth boundary line Bpt4 of the print target area PT.

As shown in FIG. 2, if Step S165 finishes, the data generating unit 250 proceeds to Step S170. In Step S170, the data generating unit 250 generates print data by using the data having been subjected to the reducing process (that is, the halftone-processed data). Thereafter, according to Steps S175 and S180, an image is printed.

FIG. 7D shows the image to be printed. As shown in FIG. 7D, the whole of the reduced object Ot is printed within the printable area PA on the print medium PM. Also, the object Ot is in contact with both of an edge of the printable area PA on the first direction (Dip) side (that is, the second boundary line Ba2) and an edge of the printable area PA on the opposite direction side to the first direction (Dip) side (that is, the fourth boundary line Ba4). As described above, since the object Ot is reduced to the largest size in order to arrange within the printable area PA, it is possible to suppress a feeling of strangeness due to the reducing process. Also, in the present embodiment, the case where it is determined that the type of the original image II is the third type IC is included in a case where it is not determined that it is capable of printing the whole of the object Ot within the printable area PA without performing the reducing process on the object Ot. Also, in the present embodiment, it can be said that the case where the type of the original image II is the third type IC is included in a case where it is not determined that it is capable of printing the whole of the object Ot within the printable area PA by performing the moving process on the object Ot without performing the reducing process on the object Ot.

Also, on the original image II (FIG. 7A), the object Ot can pass beyond an arbitrary boundary line of the boundary lines Bpt1 to Bpt4 of the print target area PT and spread out outward from the print target area PT. Therefore, the reduced object Ot is not always needed to be in contact with only the second boundary line Ba2 and the fourth boundary line Ba4 of the boundary lines Ba1 to Ba4 of the printable area PA. The reduced object Ot may be in contact with the first boundary line Ba1 and the third boundary line Ba3, or may be in contact with the all boundary lines Ba1 to Ba4.

As described above, according to the first embodiment, on the basis of the margin area information representing the margin area Am included in the original image II, and the information representing the non-printable area nPA on the print medium PM (specifically, the non-print target area information representing the non-print target area nPT on the original image II), the determining unit 240 determines the type of the original image II. The processes in the cases where the type of the original image II is the type IA, IB, or IC are summarized as follow.

The first type IA (FIGS. 5A to 5C) represents that it is capable of printing the whole of the object Ot within the printable area PA without performing both of the reducing process and the moving process on the object Ot. In the case where the type of the original image II is the first type IA ("TYPE IA" in Step S140 of FIG. 2), the data generating unit 250 generates print data without performing the reducing process and the moving process on the object Ot.

The second type IB (FIGS. 6A to 6D) represents that the type of the original image II is not the first type IA and the printing apparatus 190 is capable of printing the whole of the object Ot within the printable area PA on the print medium PM without performing the reducing process on the object Ot. In the case where the type of the original image II is the second type TB ("TYPE TB" in Step S140 of FIG. 2), the data generating unit 250 performs the moving process on the object Ot in Step S150, without performing the reducing process on the object Ot, and generates print data such that the whole of the object Ot can be printed within the printable area PA.

The third type IC represents that the type of the original image II is not any one of the first type IA and the second type TB. In the case where the type of the original image II is the third type IC ("TYPE IC" in Step S140 of FIG. 2), the data generating unit 250 performs the reducing process on the object Ot in Step S165 such that the whole of the object Ot can be printed within the printable area PA and generates print data.

As described above, regardless of the type of the original image II (that is, the shape, size, and position of the object Ot), it is possible to suppress at least a part of the object Ot from being arranged in the non-printable area nPA (that is, loss of at least a part of the object Ot). Further, in the case where the type of the original image II is the third type IC, the reducing process is performed, and in the case where the type of the original image II is any one of the first type IA and the second type TB, the reducing process is not performed. Therefore, as compared to a case of performing the reducing process regardless of the type of the original image II, it is possible to suppress the load of data processing from becoming large.

Also, the determining unit 240 determines the type of the original image II on the basis of the margin area information representing the margin area Am included in the original image II, and the information representing the non-printable area nPA on the print medium PM (specifically, the non-print target area information representing the non-print target area nPT on the original image II). Therefore, it is possible to suppress at least a part of the object Ot from being arranged in the non-printable area nPA by performing an appropriate process according to the type of the original image.

Also, in a case where the type of the original image II is not the first type IA, if the first relational expression B1 and the second relational expression B2 described above are satisfied, the determining unit 240 determines that the type of the original image II is the second type IB (that is, it is determined not to perform the reducing process). As described above, the relational expressions B1 and B2 are expressed by the parameters representing the size of the margin area Am included in the original image II, and the parameters representing the non-printable area nPA on the print medium PM (specifically, the non-print target area nPT on the original image II). Therefore, the determining unit 240 can appropriately determine the type of the original image II. Further, it is possible to suppress the object Ot from spreading out outward from the printable area PA over the entire circumference of the printable area PA.

Also, the determining unit 240 may use the following relational expressions B1x and B2x, instead of the above relational expressions B1 and B2.

(OBJECT WIDTH $tW$)≤(PRINT TARGET WIDTH $PTW$)     B1x)

(OBJECT HEIGHT $tH$)≤(PRINT TARGET HEIGHT $PTH$)     B2x)

Similarly to the case of using the above relational expressions B1 and B2, the determining unit 240 can appropriately determine the type of the original image II using the relational expressions B1x and B2x. Also, the determining unit 240 can specify the parameters tW, PTW, tH, and PTH for the relational expressions B1x and B2x, from the margin area information and the non-print target area information described above. Therefore, even in the case of determining the type of the original image using the relational expressions B1x and B2x, similarly to the case of determining the type of the original image using the relational expressions B1 and B2, it can be said that the determining unit 240 can determine whether the relational expressions are satisfied, on the basis of the information representing the margin area Am and the information representing the non-printable area nPA.

B. Second Embodiment

FIGS. 8A to 8D are explanatory views illustrating the outline of another embodiment of the reducing process. The present embodiment is different from the first embodiment described with reference to FIG. 7 that the data generating unit 250 performs the reducing process on the whole of the original image II such that the reduced original image comes into contact with both of an edge of the printable area PA on one direction side and an edge of the printable area PA on the opposite direction side to the one direction side. The process of FIG. 2 is performed similarly to the first embodiment. The configuration of a network system 1000 which is used in the second embodiment is the same as the configuration of the network system 1000 shown in FIG. 1.

Figure 8A:
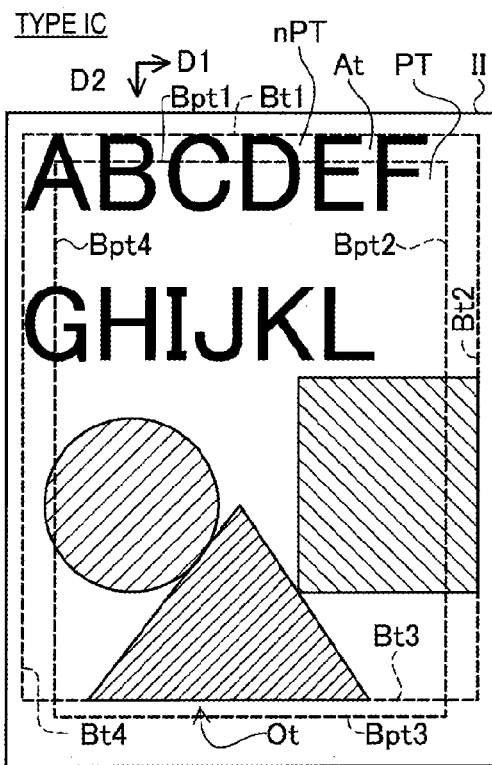
FIG. 8A is a view illustrating an original image of the third type.
Figure 8B:
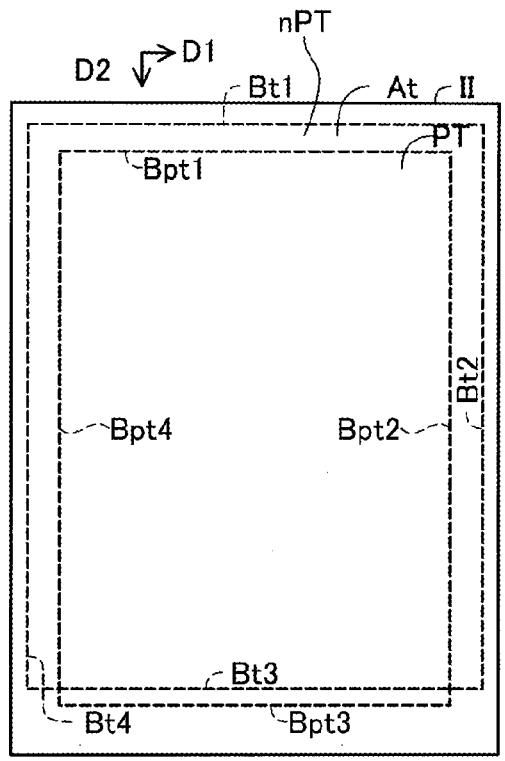
FIG. 8B is a schematic diagram illustrating an original image in a case where the type of the original image is the third type.
Figure 8C:
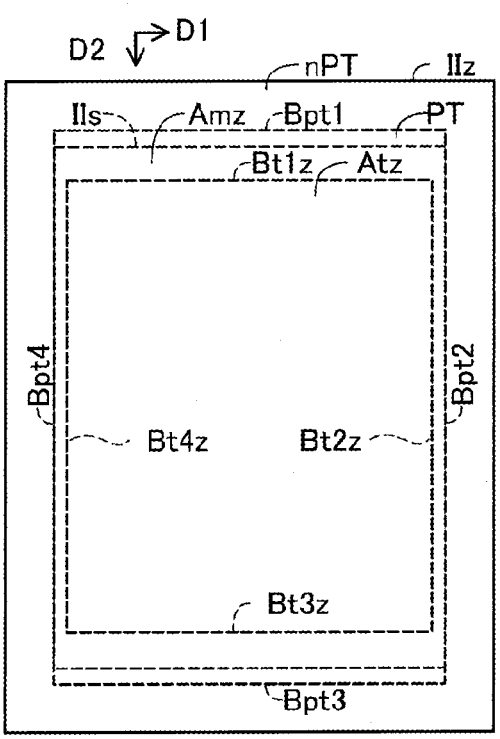
FIG. 8C is a schematic diagram illustrating an image which is represented by data having been subjected to a reducing process.

FIGS. 8A and 8B are similarly to the FIGS. 7A and 7B. FIG. 8C shows an image IIz which is represented by the data having been subjected to the reducing process. FIG. 8C shows the boundary lines Bpt1 to Bpt4 of the print target area PT and the non-print target area nPT, and the boundary lines Bt1z to Bt4z of a margin area Amz and an object area Atz representing the reduced object Ot, and the outline of the reduced original image IIs.

In Step S160 (FIG. 2), the data generating unit 250 determines a reduction rate such that the whole of the original image II can be arranged within the print target area PT. Next, in Step S165, the data generating unit 250 adjusts the position of the object area Atz such that the whole of the reduced original image IIs is arranged within the print target area PT. Also, the reduced original image IIs is in contact with both of the second boundary line Bpt2 and the fourth boundary line Bpt4 of the print target area PT. All of the boundary lines Bt1z to Bt4z of the object area Atz and the margin area Amz are apart from the boundary lines Bpt1 to Bpt4 of the print target area PT.

Figure 8D:
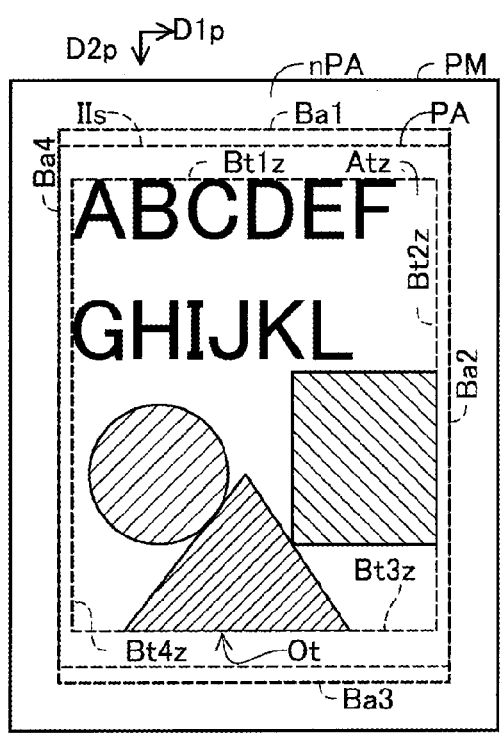
FIG. 8D is a schematic diagram illustrating an image which is printed on a print medium in a case where the type of an original image is the third type.

FIG. 8D shows the image to be printed. As shown in FIG. 8D, the whole of the reduced original image IIs (that is, the whole of the original image II including the object Ot) is printed within the printable area PA on the print medium PM. Also, the reduced original image IIs is in contact with both of an edge of the printable area PA on the first direction (D1p) side (that is, the second boundary line Ba2), and an edge of the printable area PA on the opposite direction side to the first direction (D1p) side (that is, the fourth boundary line Ba4). As described above, since the original image II is reduced to the largest size arrangeable within the printable area PA, it is possible to suppress a feeling of strangeness due to the reducing process.

Also, the ratio of the print target width PTW to the print target height PTH of the print target area PT (that is, the width to length ratio of the printable area PA) can be determined independently from the ratio of the overall width IIW to the overall height IIH of the original image II. Therefore, the reduced object Ot is not always needed to be in contact with only the second boundary line Ba2 and the fourth boundary line Ba4 of the boundary lines Ba1 to Ba4 of the printable area PA, and it may be in contact with the first boundary line Ba1 and the third boundary line Ba3.

C. Modifications (1) The moving process is not limited to the process described with reference to FIGS. 6C and 6D, and it is possible to use various processes of moving the object Ot such that the whole of the object Ot can be printed within the printable area PA. For example, the data generating unit 250 may move the object Ot such that the center position of the object Ot in the movement direction overlaps the center position of the printable area PA in the same direction (so-called centering). Alternatively, the data generating unit 250 may move the object Ot such that an edge of the object Ot on the movement direction side overlaps an edge of the printable area PA on the same direction side. Also, the movement direction is not limited to the opposite direction to a direction in which the object Ot spreads out from the print target area PT, and any other arbitrary direction can be used. For example, the data generating unit 250 may move the object Ot such that the center position of the object Ot overlaps the center position of the print target area PT.

(2) The image data which is used to specify the margin area is not limited to the decompressed bitmap data acquired by decompressing the original image data, and any other arbitrary image data representing the original image can be used. For example, the first specifying unit 220 may analyze the image data having been subjected to the color conversion of Step S120, thereby specifying the margin area. Alternatively, the first specifying unit 220 may analyze the image data having been subjected to the half-tone process of Step S125, thereby specifying the margin area. In general, the first specifying unit 220 can specify the margin area by analyzing at least one of the original image data and intermediate data (image data representing the original image) acquired in the middle of the process of generating the print data from the original image data. Even in any case, it can be said that specifying of the margin area based on an analysis of image data representing the original image (that is, the object) is specifying of the margin area based on an analysis of the original image.

(3) The image data to be the target of the reducing process and the moving process is not limited to the halftone data, and any other arbitrary image data representing the original image can be used. For example, the data generating unit 250 may perform the reducing process and the moving process on the decompressed bitmap data acquired by decompressing the original image data. Alternatively, the data generating unit 250 may perform the reducing process and the moving process on the image data having been subjected to the color conversion of Step S120. In general, the data generating unit 250 can perform the reducing process and the moving process on at least one of the original image data and intermediate data (image data representing the original image) acquired in the middle of the process of generating the print data from the original image data. Even in any case, it can be said that the reducing process and the moving process on image data representing the original image (that is, the object) are the reducing process and the moving process on the object.

(4) As the process of generating the print data, various other processes different from the process shown in FIG. 2 can be used. For example, as the process in a case where the above relational expressions B1, B2, and B3 are satisfied so as to determine that the type of the original image II is the second type IB, similarly to the embodiment of FIGS. 8A to 8D, the reducing process may be performed such that the whole of the reduced original image IIs can be printed within the printable area PA. In this case, even if the above relational expressions B1, B2, and B3 are satisfied so as to determine that the type of the original image II is the second type IB, the object Ot is downsized. Therefore, it can be said that the case where the above relational expressions B1, B2, and B3 are satisfied so as to determine that the type of the original image II is the second type IB is included in a case where it is not determined that it is capable of printing the whole of the object Ot within the printable area PA without performing the reducing process on the object Ot. Also, in a case where the object area At is smaller than the print target area PT, that is, in a case where the relational expressions A1 to A4 are satisfied so as to determine that the type of the original image II is the first type IA, or the relational expressions B1 to B3 are satisfied so as to determine that the type of the original image II is the second type IB, the data generating unit 250 may magnify the object area At (that is, the object Ot) such that the whole of the object Ot becomes the largest size arrangeable within the printable area PA. Also, in a state where the data having been subjected to the processes of Steps S105 to S130 of FIG. 2 is partial data of the original image data, it may be possible to determine the type of the original image II using the margin area information updated in Step S115, and the information representing the non-printable area nPA (specifically, the non-print target area information representing the non-print target area nPT on the original image II). In this case, the determining unit 240 may determine the type of the original image II when the determination is possible.

(5) As the data format of the original image data, various other formats different from the compressed bitmap format can be used. For example, an uncompressed bitmap format may be used. Regardless of whether the original image data has been compressed or not, in a case of using the original image data having a bitmap format to perform printing, a part of the object included in the original image represented by the original image data may be arranged in the non-printable area nPA on the print medium PM (FIG. 4B). Here, similarly to each embodiment or each modification described above, since the image processing apparatus 100 performs the reducing process or the moving process on the object according to the type of the original image II, it is possible to suppress the object from spreading out from the printable area PA, and it is possible to suppress the load of data processing from becoming large.

(6) In the embodiment shown in FIG. 1, the image processing apparatus 100 and the printing apparatus 190 may be configured as separate apparatuses. Also, the functions for image processing (the functions of the image processing apparatus 100) may be implemented by an apparatus (for example, a personal computer) of a type different from the printer system 200. Also, a plurality of apparatuses (for example, computers) capable of communication with one another through a network may share the image processing functions of the image processing apparatus 100, thereby providing the image processing functions as a whole (a system including these apparatuses corresponds to the image processing apparatus).

In each embodiment described above, some of components implemented by hardware may be replaced by software, and conversely, some or all of components implemented by software may be replaced by hardware. For example, the function of the data generating unit 250 of FIG. 1 may be implemented by a dedicated hardware circuit having a logic circuit.

Also, in a case where some or all of the functions of this disclosure are implemented by a computer program, this program can be stored in a computer-readable recording medium (for example, a recording medium which is not temporary) to be provided. The program can be supplied in a state where the program is contained on a recording medium (a computer-readable recording medium). The program can be used in a state where the program is contained on the supplied recording medium or any other recording medium (a computer-readable recording medium). Examples of the computer-readable recording media include not only portable recording media such as memory cards and CD-ROMs, but also internal storage devices such as various ROMs installed in computers, and external storage devices such as hard disk drives connected to computers.

Although the examples and this disclosure based on the examples have been described above, the embodiments of this disclosure are provided for the purpose of helping better understanding of this disclosure but do not limit the scope of this disclosure. This disclosure may include alterations, changes, and modifications of the embodiments without departing from the gist of this disclosure and the scope of claims, and also includes equivalents thereof.

What is claimed is:

1. An image processing apparatus comprising:
a processor;
memory storing instructions that, when executed by the processor, causing the apparatus to perform:
   acquiring original image data representing an original image, the original image including a plurality of objects;
   analyzing the original image data so as to specify a minimum circumscribed rectangle, the minimum circumscribed rectangle surrounding the plurality of objects and each four side of the minimum circumscribed rectangle circumscribing at least one of the plurality of objects;
   analyzing the original image data so as to specify a margin area, the margin area being an area located outside the minimum circumscribed rectangle and further located inside an outer edge rectangle, each four side of the outer edge rectangle being consisted by each four side of the original image;
   specifying a non-printable area, which is located at a periphery of a print medium to be used by a printing apparatus and to which the printing apparatus is not capable of printing;
   determining, on the basis of information representing the non-printable area and information representing the margin area, whether the printing apparatus is capable of printing the whole of the plurality of objects of the original image within a printable area on the print medium, to which the printing apparatus is capable of printing, without performing a reducing process, which reduces the size of the plurality of objects, on the plurality of objects; and
   generating print data to be supplied to the printing apparatus, from the original image data, according to a result of the determining,
   wherein in a case where the original image data represents a first original image, where the specified margin area has a first size, and where it is determined, on the basis of the information representing the non-printable area and the information representing the margin area, that the printing apparatus is capable of printing the whole of the plurality of objects of the first original image within the printable area without performing the reducing process on the object, the print data is generated without performing the reducing process on the plurality of objects, and
   wherein, in a case where the original image data represents a second original image different from the first original image, where the specified margin area has a second size different from the first size, and where it is determined, on the basis of the information representing the non-printable area and the information representing the margin area, that the printing apparatus is not capable of printing the whole of the plurality of objects of the second original image within the printable area without performing the reducing process on the plurality of objects, the reducing process is performed on the plurality of objects such that the whole of the plurality of the objects of the second original image is capable of printing within the printable area, and the print data is generated.

2. The image processing apparatus according to claim 1,
wherein memory stores instructions that, when executed by the processor, further causing the apparatus to perform:
   determining, on the basis of the information representing the non-printable area and the information representing the margin area, whether the printing apparatus is capable of printing the whole of the plurality of objects within the printable area by performing a moving process on the plurality of objects without performing the reducing process on the plurality of objects,
   wherein in a case where it is determined, on the basis of the information representing the non-printable area and the information representing the margin area, that it is capable of printing the whole of the plurality of objects of the original image within the printable area by performing the moving process on the plurality of objects without performing the reducing process on the plurality of objects, the moving process is performed such that the whole of the plurality of objects of the original image can be printed within the printable area, and the print data is generated without performing the reducing process.

3. The image processing apparatus according to claim 2,
wherein an area, which is included in the original image and is associated with the printable area, is set to a print target area,
wherein a movement destination position for the moving process on the plurality of objects is determined such that a portion, which is included in a outer portion being a portion of the plurality of objects of the original image located outside the print target area and is farthest from the print target area, is to be arranged on an edge of the printable area on the print medium.

4. The image processing apparatus to claim 1,
wherein memory stores instructions that, when executed by the processor, further causing the apparatus to perform:
   determining, on the basis of whether a length of the plurality of objects in a first direction is equal to or less than a length of a print target area, which is included in the original image and is associated with the printable area, in the first direction and whether a length of the plurality of objects in a second direction perpendicular to the first direction is equal to or less than a length of the print target area in the second direction, whether it is capable of printing the whole of the plurality of objects of the original image within the printable area without performing the reducing process on the plurality of objects.

5. The image processing apparatus according to claim 1,
wherein, the original image includes an area, which is referred to as a non-print target area, associated with the non-printable area,
wherein the margin area of the original image includes a part, which is located at an edge on a forward direction side of the first direction and a part, which is located at an edge on an opposite direction side to the first direction, and the sum of the lengths of the two parts is referred to as a first margin length,
wherein the margin area of the original image includes a part, which is located at an edge on an forward direction side of the second direction perpendicular to the first direction and a part, which is located at an edge on an opposite direction side to the second direction, and the sum of the lengths of the two parts is referred to as a second margin length,
wherein the non-print target area of the original image includes a part, which is located at an edge on an forward direction side of the first direction and a part, which is located at an edge on an opposite direction side to the first direction, and the sum of the lengths of the two parts is referred to as a first non-target area length, and wherein the non-print target area of the original image includes a part, which is located at an edge on an forward direction side of the second direction and a part, which is located at an edge on the opposite direction side to the second direction, and the sum of the lengths of the two parts is referred to as a second non-target area length, wherein it is determined, on the basis of whether the first margin length is equal to or larger than the first non-target area length and whether the second margin length is equal to or larger than the second non-target area length, whether it is capable of printing the whole of the plurality of objects of the original image within the printable area without performing the reducing process on the plurality of objects.

6. The image processing apparatus according to claim 1, wherein the reducing process is performed such that a reduced object comes into contact with both of an edge of the printable area on the print medium on a forward direction side of one direction and an edge of the printable area on an opposite direction side to the one direction.

7. The image processing apparatus according to claim 1, wherein the reducing process is performed such that a reduced original image acquired by reducing the whole of the original image comes into contact with both of an edge of the printable area on the print medium on a forward direction side of one direction and an edge of the printable area on an opposite direction side to the one direction.

8. The image processing apparatus according to claim 1, wherein each of the plurality of objects is one of a character object and an image object.

9. An image processing apparatus comprising:
a processor;
memory storing instructions that, when executed by the processor, causing the apparatus to perform:
  acquiring original image data representing an original image including the original image including a plurality of objects;
  analyzing the original image data so as to specify a minimum circumscribed rectangle, the minimum circumscribed rectangle surrounding the plurality of objects and each four side of the minimum circumscribed rectangle circumscribing at least one of the plurality of objects;
  analyzing the original image data so as to specify a margin area, the margin area being an area located outside the minimum circumscribed rectangle and further located inside an outer edge rectangle, each four side of the outer edge rectangle being consisted by each four side of the original image;
  specifying a non-printable area, which is located at a periphery of a print medium to be used by a printing apparatus and to which the printing apparatus is not capable of printing;
  determining, on the basis of information representing the non-printable area and information representing the margin area, whether the printing apparatus is capable of printing the whole of the plurality of objects of the original image within a printable area on the print medium, to which the printing apparatus is capable of printing, by performing a moving process on the plurality of objects without performing a reducing process, which reduces the size of the plurality of objects, on the plurality of objects; and
  generating print data to be supplied to the printing apparatus, from the original image data, according to a result of the determining,
  wherein in a case where the original image data represents a first original image, where the specified margin area has a first size, and where it is determined on the basis of the information representing the non-printable area and the information representing the margin area that it is capable of printing the whole of the plurality of objects of the first original image within the printable area by performing the moving process on the plurality of objects without performing the reducing process on the plurality of objects, the moving process is performed on the plurality of objects without performing the reducing process on the plurality of objects, and the print data is generated.

10. The image processing apparatus according to claim 9, wherein, in a case where the original image data represents a second original image different from the first original image, where the specified margin area has a second size different from the first size, and where it is determined, on the basis of the information representing the non-printable area and the information representing the margin area, that it is not capable of printing the whole of the plurality of objects within the printable area by performing the moving process on the plurality of objects without performing the reducing process on the plurality of objects, the reducing process is performed on the plurality of objects, and the print data is generated.

11. A non-transitory computer-readable medium having instructions to control a computer to perform operations comprising:
  acquiring original image data representing an original image, the original image including a plurality of objects;
  analyzing the original image data so as to specify a minimum circumscribed rectangle, the minimum circumscribed rectangle surrounding the plurality of objects and each four side of the minimum circumscribed rectangle circumscribing at least one of the plurality of objects;
  analyzing the original image data so as to specify a margin area, the margin area being an area located outside the minimum circumscribed rectangle and further located inside an outer edge rectangle, each four side of the outer edge rectangle being consisted by each four side of the original image;
  specifying a non-printable area, which is located at a periphery of a print medium to be used by a printing apparatus and to which the printing apparatus is not capable of printing;
  determining, on the basis of information representing the non-printable area and information representing the margin area, whether the printing apparatus is capable of printing the whole of the plurality of objects of the original image within a printable area on the print medium, to which the printing apparatus is capable of printing, without performing a reducing process, which reduces the size of the plurality of objects, on the plurality of objects; and generating print data to be supplied to the printing apparatus, from the original image data, according to a result of the determining, wherein in a case where the original image data represents a first original image, where the specified margin area has a first size, and where it is determined, on the basis of the information representing the non-printable area and the information representing the margin area, that the printing apparatus is capable of printing the whole of the plurality of objects of the first original image within the printable area without performing the reducing process on the plurality of objects, the print data is generated without performing the reducing process on the plurality of objects, and wherein, in a case where the original image data represents a second original image different from the first original image, where the specified margin area has a second size different from the first size, and where it is determined, on the basis of the information representing the non-printable area and the information representing the margin area, that the printing apparatus is not capable of printing the whole of the plurality of objects of the second original image within the printable area without performing the reducing process on the plurality of objects, the reducing process is performed on the plurality of objects such that the whole of the plurality of objects of the second original image is capable of printing within the printable area, and the print data is generated.

12. A non-transitory computer-readable medium having instructions to control a computer to perform operations comprising:

acquiring original image data representing an original image, the original image including a plurality of objects;

analyzing the original image data so as to specify a minimum circumscribed rectangle, the minimum circumscribed rectangle surrounding the plurality of objects and each four side of the minimum circumscribed rectangle circumscribing at least one of the plurality of objects;

analyzing the original image data so as to specify a margin area, the margin area being an area located outside the minimum circumscribed rectangle and further located inside an outer edge rectangle, each four side of the outer edge rectangle being consisted by each four side of the original image;

specifying a non-printable area, which is located at a periphery of a print medium to be used by a printing apparatus and to which the printing apparatus is not capable of printing;

determining, on the basis of information representing the non-printable area and information representing the margin area, whether the printing apparatus is capable of printing the whole of the plurality of objects of the original image within a printable area on the print medium, to which the printing apparatus is capable of printing, by performing a moving process on the plurality of objects without performing a reducing process, which reduces the size of the plurality of objects, on the plurality of objects; and generating print data to be supplied to the printing apparatus, from the original image data, according to a result of the determining, wherein in a case where the specified margin area has a size, and where it is determined on the basis of the information representing the non-printable area and the information representing the margin area that it is capable of printing the whole of the plurality of objects of the original image within the printable area by performing the moving process on the plurality of objects without performing the reducing process on the plurality of objects, the moving process is performed on the plurality of objects without performing the reducing process on the plurality of objects, and the print data is generated.

* * * * *